United States Patent Office.

CHASE A. STEVENS, OF NEW YORK, N. Y.

Letters Patent No. 101,394, dated March 29, 1870.

IMPROVEMENT IN PACKING JOURNALS, AND OTHER PARTS OF MACHINERY.

The Schedule referred to in these Letters Patent and making part of the same

*To all whom it may concern:*

Be it known that I, CHASE A. STEVENS, of the city and State of New York, but at present doing business at Boston, in the county of Suffolk, and State of Massachusetts, have invented a new and improved Material for Packing for Journals and other parts of Machinery; and I do hereby declare the following to be full, clear, and exact description thereof, which will enable those skilled in the art to make and use the same.

This invention relates to packing made from pure asbestos, amianthus, or other fibrous mineral. In carrying out my invention I subject crude asbestos or other fibrous mineral to treatment with suitable acids, or other means, so as to disintegrate and bring it to a a fibrous condition, after which I subject it to the operation of "picking" by suitable machinery, similar to the operation of picking cotton and wool, whereby I bring it to a fine, flexible, and loose or flocky condition. In this state the asbestos, or other fibrous minerals, is suitable for packing journal-boxes of car-axles and bearings of heavy shafting, and wherever loose packing can be used.

Such fibrous minerals possess in themselves lubricating qualities which enables me to dispense, in some cases, with the use of oil with my packing, but it can be used with or without the addition of oil or other lubricators. When additional lubrication is preferred I saturate the asbestos, and other fibrous minerals, with suitable oils, such, for example, as lard-oil, but use much less in quantity than is common with cotton-waste packing.

Said packing is a poor conductor of heat and electricity, and does not promote the generation of heat like cotton or other vegetable packing in the presence of oil; it is at the same time a better absorbent of oils than either vegetable or animal fibers, and the oil is more thoroughly diffused and disseminated through the mass than is the case with such other packings, and it retains the oil in absorption without much evaporation or volatilization. It is, moreover, elastic and durable to a high degree, and is not combustible at a temperature below about two thousand degrees.

In order to apply my asbestos or other mineral packing to piston-rods, and other parts of machinery where rope packing is desired, I take the pure asbestos or other fibrous mineral in its flocky condition, and form strands or ropes by combining it with a central cord of twine, or other material which has sufficient tensile strength for the purpose required, securing the asbestos fibers around the same with binding-threads of animal or vegetable fibers which are wound around the mass, and arranged so as to be concealed and protected to as great a degree as possible by the overlapping mineral fibers which preserve them from being burnt or destroyed by heat or friction.

My asbestos or mineral-rope packing above described can be made by hand or by machinery, and of any desired thickness, and several strands thereof can be combined together to form thicker ropes or strands.

My rope packing is applicable for packing pistons of steam-engines and pumps, and for valves and other articles, and the same can be used without other lubrication, the lubricating quality of said asbestos or other fibrous mineral being in such case sufficient for the purpose.

I do not wish to confine myself to any particular shape of my rope packing, as I can make the same flat as well as round, or of other forms. My mineral-rope packing thus made has sufficient compactness and strength to bear handling, and to endure any ordinary strain to which it may be subjected when applied to use.

What I claim as new, and desire to secure by Letters Patent, is—

1. A rope packing made of loose fibers of asbestos or other fibrous mineral combined with a central cord substantially as and for the purpose set forth.

2. The combination of asbestos or other fibrous mineral with a central cord and with binding-threads, substantially as described.

CHASE A. STEVENS.

Witnesses:
W. HAUFF,
E. F. KASTENHUBER.